United States Patent
Hada

(10) Patent No.: US 10,105,776 B2
(45) Date of Patent: Oct. 23, 2018

(54) WIRE ELECTRIC DISCHARGE MACHINE HAVING FUNCTION TO CORRECT DETECTED VALUE OF TENSILE FORCE

(71) Applicant: FANUC Corporation, Yamanashi (JP)

(72) Inventor: Keita Hada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 232 days.

(21) Appl. No.: 15/062,106

(22) Filed: Mar. 5, 2016

(65) Prior Publication Data

US 2016/0263690 A1 Sep. 15, 2016

(30) Foreign Application Priority Data

Mar. 6, 2015 (JP) ................. 2015-044991

(51) Int. Cl.
  *B23H 7/04* (2006.01)
  *B23H 7/10* (2006.01)
  *B23H 7/26* (2006.01)
(52) U.S. Cl.
  CPC ............... *B23H 7/04* (2013.01); *B23H 7/104* (2013.01); *B23H 7/265* (2013.01)
(58) Field of Classification Search
  CPC .......... B23H 7/04; B23H 7/265; B23H 7/104; B23H 7/20
  See application file for complete search history.

(56) References Cited

U.S. PATENT DOCUMENTS

| 4,298,782 A | 11/1981 | Wavre |
| 5,039,834 A | 8/1991 | Obara et al. |
| 5,216,217 A * | 6/1993 | Morishita ............... B23H 7/104 219/69.12 |
| 6,028,282 A * | 2/2000 | Toyonaga ............... B23H 7/104 219/69.12 |
| 2008/0217300 A1 | 9/2008 | Kita et al. |
| 2012/0298220 A1 | 11/2012 | Hidaka et al. |

(Continued)

FOREIGN PATENT DOCUMENTS

| CN | 101670472 A | 3/2010 |
| CN | 203254023 U | 10/2013 |

(Continued)

OTHER PUBLICATIONS

Machine translation of Japan Patent document No. 5-312,657, Jan. 2018.*

(Continued)

*Primary Examiner* — Geoffrey S Evans

(74) *Attorney, Agent, or Firm* — Hauptman Ham, LLP

(57) ABSTRACT

There is provided a wire electric discharge machine including a calibrating unit which carries out calibration for obtaining a detected deviation amount of the tensile force detector based on the set tensile force and a tensile force detected by the tensile force detector when the set tensile force is applied, the calibrating unit correcting output of the tensile force detector by the detected deviation amount which is obtained by the calibration, and the wire electric discharge machine carries out feedback control of the tensile force of the wire electrode based on a corrected detected tensile force which is obtained by correcting the detected tensile force of the tensile force detector by the calibrating unit.

7 Claims, 5 Drawing Sheets

(56) References Cited

U.S. PATENT DOCUMENTS

| | | |
|---|---|---|
| 2013/0240486 A1 | 9/2013 | Yamada et al. |
| 2014/0291295 A1 | 10/2014 | Kasai |
| 2015/0290733 A1 * | 10/2015 | Nakagawa ............. B23H 7/104 219/69.12 |

FOREIGN PATENT DOCUMENTS

| | | | |
|---|---|---|---|
| JP | 59-152021 A | | 8/1984 |
| JP | 59-152022 A | | 8/1984 |
| JP | 60-177824 A | | 9/1985 |
| JP | 63-127830 A | | 5/1988 |
| JP | 63-256316 A | | 10/1988 |
| JP | 5-312657 A | * | 11/1993 |
| JP | H07328849 A | | 12/1995 |
| JP | 11-254240 A | * | 9/1999 |
| JP | 2000-292146 A | | 10/2000 |
| JP | 2002-340711 A | * | 11/2002 |
| JP | 2002-346840 A | * | 12/2002 |
| JP | 3416514 B2 | | 6/2003 |
| JP | 2003-266247 A | * | 9/2003 |
| JP | 2005-161644 A | | 6/2005 |
| JP | 2008-221343 A | | 9/2008 |
| JP | 4230157 B2 | | 2/2009 |
| JP | 2009-180523 A | | 8/2009 |
| JP | 2010-179377 A | | 8/2010 |
| JP | 2014-28463 A | | 2/2014 |
| WO | 2011/067877 A1 | | 6/2011 |
| WO | 2012053568 A1 | | 4/2012 |
| WO | 2014/068679 A1 | | 5/2014 |

OTHER PUBLICATIONS

Decision to Grant a Patent in JP Application No. 2015-044991, dated Mar. 28, 2017.
Extended European Search Report in EP Application No. 16158750.6, dated Jul. 25, 2016.
Chinese Office Action for Application No. 2016101249449 dated Jan. 31, 2018; 14 pages.

* cited by examiner

WIRE ELECTRIC DISCHARGE MACHINE HAVING FUNCTION TO CORRECT DETECTED VALUE OF TENSILE FORCE

RELATED APPLICATIONS

The present application claims priority to Japanese Patent Application Number 2015-044991, filed Mar. 6, 2015, the disclosure of which is hereby incorporated by reference herein in its entirety.

BACKGROUND OF THE INVENTION

1. Field of the Invention

The present invention relates to a wire electric discharge machine, and more particularly, to a wire electric discharge machine which detects a tensile force of a wire electrode and performs feedback control of the wire electrode.

2. Description of the Related Art

In a wire electric discharge machine, an appropriate tensile force is applied to a wire electrode and electric discharge is carried out. By applying the tensile force to the wire electrode, vibration of the wire electrode is suppressed and precise machining is obtained. However, if the tensile force applied to the wire electrode is excessively strong, there is fear that the wire electrode is cut and the machining is interrupted. If the tensile force applied to the wire electrode is excessively weak on the other hand, vibration of the wire electrode cannot be suppressed, and the machining precision is deteriorated. Hence, it is necessary to apply an appropriate tensile force to the wire electrode during the machining.

As methods of applying a tensile force to a wire electrode, there is a method in which a wire electrode is wound around a brake roller connected to an electromagnetic brake, or a wire electrode is pressed against a brake roller by a pinch roller, and voltage applied to the electromagnetic brake is controlled, thereby controlling the tensile force to be applied to the wire electrode, and there is also another method in which rollers for guiding a running state of a wire electrode are placed upstream and downstream of a wire electrode which runs such that the rollers sandwich an electric discharge region, and speed or a torque of a motor which drives the rollers are controlled, thereby controlling a tensile force of the wire electrode.

Optimal tensile force applied to a wire electrode differs depending upon a wire diameter and a kind of the wire electrode and a kind of machining, and a range of magnitude of the tensile force to be set is wide. However, it is difficult to precisely set a minute or fine difference of the tensile force. Hence, there is used a method in which a tensile force of a wire electrode is measured using a tensile force detector, and the tensile force of the wire electrode is feedback controlled based on the measured tensile force.

For example, JP 4230157 B1 describes an invention that a brake roller placed upstream of a wire electrode which runs and a lower roller placed downstream of the wire electrode sandwich a machining region, a wire electrode is wound between the brake roller and the lower roller, a tensile force detector for detecting a tensile force of the wire electrode between the brake roller and the lower roller is provided, a speed command is output to a recovery motor which drives a recovery roller placed below the lower roller, thereby controlling the speed of the recovery motor and driving the same, a current command is produced for a brake motor which drives the brake roller based on a tensile force command signal, based on a tensile force detection signal detected by the tensile force detector, based on a speed command to the brake motor, and based on a speed detection signal from a speed detector of the brake motor, and the current command is output to the brake motor to control (torque control) the same, thereby controlling the tensile force of the wire electrode.

Further, JP 3416514 B1 describes an invention that a take-back motor which takes back a wire electrode is driven at predetermined speed, a speed command for a brake motor is produced based on a tensile force setting signal, a tensile force actually measured value detected by a tensile force detector, and a speed setting signal, and the speed of the brake motor is controlled by the produced speed command, thereby controlling the tensile force of the wire electrode.

Furthermore, JP 2010-179377 A describes an invention that a tensile force detecting device for detecting a tensile force of a wire electrode which runs in a machining region is provided, and speed or torque of a brake motor which drives a brake roller placed upstream of a running state of the wire electrode, or speed or torque of a sending-out motor for driving a roller which sends out the wire electrode placed downstream of the running state of the wire electrode are controlled such that the tensile force detected by the tensile force detecting device becomes equal to a set tensile force, thereby controlling the tensile force of the wire electrode.

A method of detecting a tensile force of a wire electrode by a tensile force detector and feedback controlling the tensile force of the wire electrode using the detected tensile force is generally employed. However, although the tensile force detector can measure variation in the tensile force by fine resolution, a range where the tensile force can precisely be detected is small. Further, a detected value is varied depending upon a kind of the tensile force detector and depending upon temperature variation, and the tensile force cannot be measured precisely and as a result, there is a problem that a tensile force cannot precisely be controlled. There is a method of calibrating a tensile force detector using a thermometer, but since individual variability exists in the tensile force detectors, it is necessary to perform calibration for every tensile force detector, and there is a problem that the number of operation steps is increased.

SUMMARY OF THE INVENTION

Hence, it is an object of the present invention to enhance the precision of wire electric discharge machining and to prevent a wire electrode from being cut.

A wire electric discharge machine according to the present invention includes: a tensile force generating unit for giving a tensile force to a wire electrode; and a tensile force detector for detecting a tensile force of the wire electrode, in which a detected tensile force detected by the tensile force detector is fed back to perform feedback control of the tensile force of the wire electrode such that the tensile force becomes equal to a set tensile force, wherein the wire electric discharge machine further includes a calibrating unit which carries out calibration for obtaining a detected deviation amount of the tensile force detector based on the set tensile force and a tensile force detected by the tensile force detector when the set tensile force is applied, the calibrating unit correcting output of the tensile force detector by the detected deviation amount which is obtained by the calibration, and the wire electric discharge machine carries out feedback control of the tensile force of the wire electrode based on a corrected detected tensile force which is obtained by correcting the detected tensile force of the tensile force detector by the calibrating unit.

In the calibration of the calibrating unit, the detected deviation amount may be obtained and stored as a function of the set tensile force, and when electric discharge machining is carried out, the calibrating unit obtains a detected deviation amount with respect to a value of the tensile force to be set by the function, and the detected tensile force detected by the tensile force detector is corrected with the detected deviation amount, as a corrected detected tensile force.

In the calibration of the calibrating unit, sequence of points of a combination of a plurality of set tensile forces and a tensile force detected by the tensile force detector when the set tensile forces are applied may be stored, and when electric discharge machining is carried out, a detected deviation amount with respect to a tensile force which is set when machining is carried out may be obtained by the sequence of points of a combination of the stored set tensile force and the detected tensile force, and the detected tensile force detected by the tensile force detector is corrected with the detected deviation amount, as a corrected detected tensile force.

The tensile force generating unit may be a motor which applies a driving force to the wire electrode.

The calibration of the tensile force detector may be carried out when a sending operation of the wire electrode is stopped.

The calibration of the tensile force detector may be carried out when the wire electrode is sent out.

Further, the calibration of the tensile force detector may be automatically carried out when temperature is changed by a given amount, or information inducing calibration of the tensile force detector is displayed.

According to the present invention, a deviation amount of a detected tensile force of a tensile force detector is obtained as a function of a set tensile force value, and a detected tensile force value is corrected. Therefore, it is possible to precisely detect a tensile force, and to feedback control a tensile force of a wire electrode and thus, it is possible to enhance the precision of the wire electric discharge machining and to prevent the wire electrode from being cut.

BRIEF DESCRIPTION OF THE DRAWINGS

These and other objects and features of the invention will become clear by the following description of a preferred embodiment with reference to the accompanying drawings, wherein.

DETAILED DESCRIPTION OF THE PREFERRED EMBODIMENTS

Figure 1:
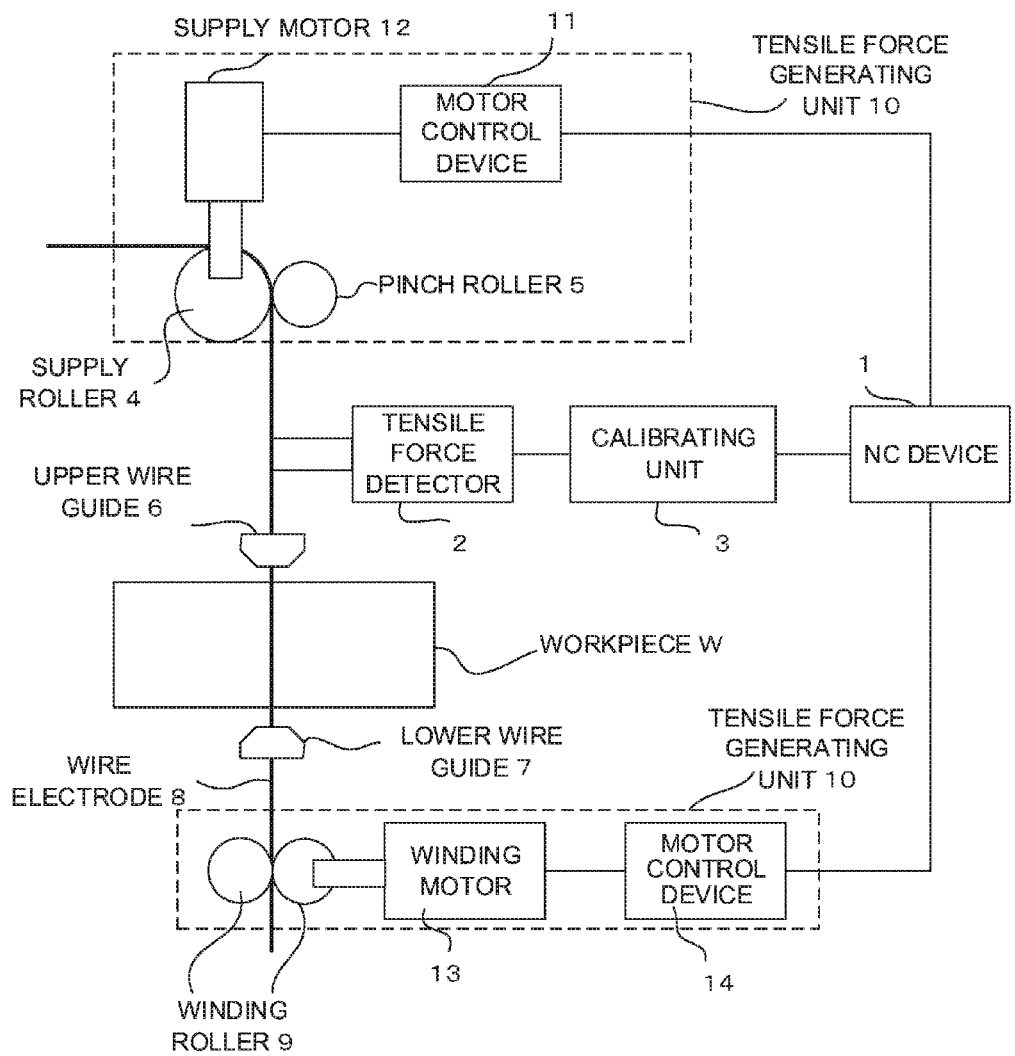
FIG. 1 is a schematic diagram of an embodiment of the present invention.

FIG. 1 is a schematic diagram of an embodiment of the present invention. A wire electrode 8 is pulled out from a source bobbin (not shown), the wire electrode 8 passes through an upper wire guide 6 and a lower wire guide 7 while being pressed against a supply roller 4 by a pinch roller 5, and the wire electrode 8 is sandwiched between winding rollers 9 and 9 and is sent out. A workpiece W is electric discharge machined between the upper wire guide 6 and the lower wire guide 7. The supply roller 4 is driven by a supply motor 12, and the winding rollers 9 are driven by a winding motor 13. Driving states of the supply motor 12 and the winding motor 13 are controlled through motor control devices 11 and 14 based on commands from an NC device (numerical controller) 1, and a running state and a tensile force of the wire electrode are controlled. The supply roller 4, the pinch roller 5, the supply motor 12, the motor control device 11, the winding rollers 9 and 9, the winding motor 13 and the motor control device 14 configure a tensile force generating unit 10 which gives a tensile force to the wire electrode 8.

There is provided a tensile force detector 2 for detecting a tensile force of the wire electrode 8 in a zone between the supply roller 4 and the winding rollers 9 including an electric discharge machining region. The tensile force detector 2 detects a tensile force of the wire electrode 8 and outputs the same to a calibrating unit 3. The calibrating unit 3 is a unit for calibrating the tensile force detector 2, and the calibrating unit 3 corrects a tensile force detected by the tensile force detector 2 and outputs the corrected detected tensile force to the NC device 1. The NC device 1 controls speed or torque of the supply motor 12 and the winding motor 13 as in the conventional technique based on a command tensile force and the corrected detected tensile force which is input, thereby performing the feedback control such that the tensile force of the wire electrode 8 matches with the command tensile force.

The present invention is the same as the conventional technique in that a tensile force of a wire electrode is detected using a tensile force detector, and feedback control is performed such that the tensile force of the wire electrode 8 matches with the command tensile force, but the invention is characterized in that the calibrating unit 3 which corrects output of the tensile force detector 2 is added, and a deviation amount of the output of the tensile force detector 2 is corrected.

Although the calibrating unit 3 is provided outside the NC device 1 in the embodiment shown in FIG. 1, the calibrating unit 3 may be provided in the NC device 1 and a processor of the NC device 1 may carry out the operation and the processing as the calibrating unit 3.

FIGS. 2 to 5 are explanatory diagrams of first to fourth aspects of a calibrating operational principle carried out by the calibrating unit 3, and are explanatory diagrams of a method for obtaining a detected deviation amount between a detected tensile force and an ideal value (actual tensile force) as a function with respect to a set tensile force.

The tensile force generating unit 10 gives a set tensile force x to the wire electrode 8, and detects (detected value y) a tensile force by the tensile force detector 2. This operation is carried out for one or more set tensile forces x. From obtained sequence of points, it is possible to obtain relational expression y=f(x) using a tensile force y detected by the tensile force detector 2 as a function of the set tensile force x. When the set tensile force x is given to the wire electrode 8, the tensile force of the wire electrode is x. As a detected tensile force y which is output from the tensile force detector 2, a fact that y=x is an expected value, and this is the ideal value. Hence, a detected deviation amount d that is a detected deviation amount from the ideal value of the detected tensile force value which is output from the tensile force detector 2 is obtained as d=f(x)−x.

When the electric discharge machining is carried out, a detected tensile force y which is output from the tensile force detector 2 is corrected with the detected deviation amount d obtained by a set (command) tensile force x, and the corrected detected tensile force is output. According to this, the detected deviation of the tensile force detector 2 is corrected and a precise tensile force can be detected.

Figure 2:
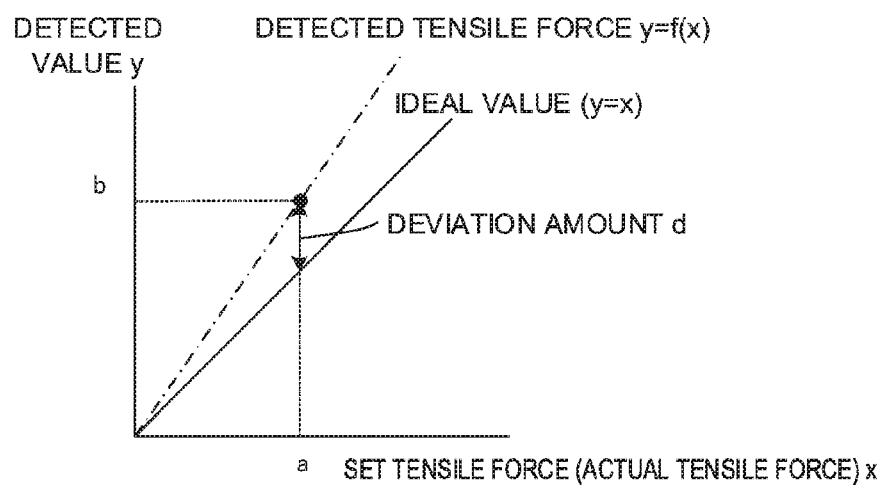
FIG. 2 shows a relational expression between a set tensile force and a detected tensile force in the embodiment, and is an explanatory diagram of a first aspect for obtaining a detected deviation amount deviated from an ideal value.

FIG. 2 is an explanatory diagram of the first aspect of the method in which a set tensile force x is one point, a relational expression y=f(x) of the set tensile force and the detected value is obtained by the tensile force y detected by the tensile force detector 2 at that time, and a detected deviation amount d is obtained. This first aspect is applied to a tensile force detector in which when the set tensile force (tensile force of wire electrode) x is 0, a detected tensile force y of the tensile force detector 2 is 0, and a detected tensile force y of the tensile force detector 2 is simply proportional to a set tensile force (expected value as actual tensile force, ideal value) x.

The tensile force generating unit 10 is driven, speed and torque of the supply motor 12 and the winding motor 13 are controlled, a set tensile force x=a is given to the wire electrode, and the tensile force detector 2 detects a tensile force. Suppose that this detected tensile force y is b.

Then, a relational expression f(x) between the set tensile force x and the detected tensile force y becomes $$f(x)=(b/a)x \quad (1), \text{ and}$$

the detected deviation amount d becomes $$d=(b/a)x-x=((b/a)-1)x \quad (2).$$

Figure 3:
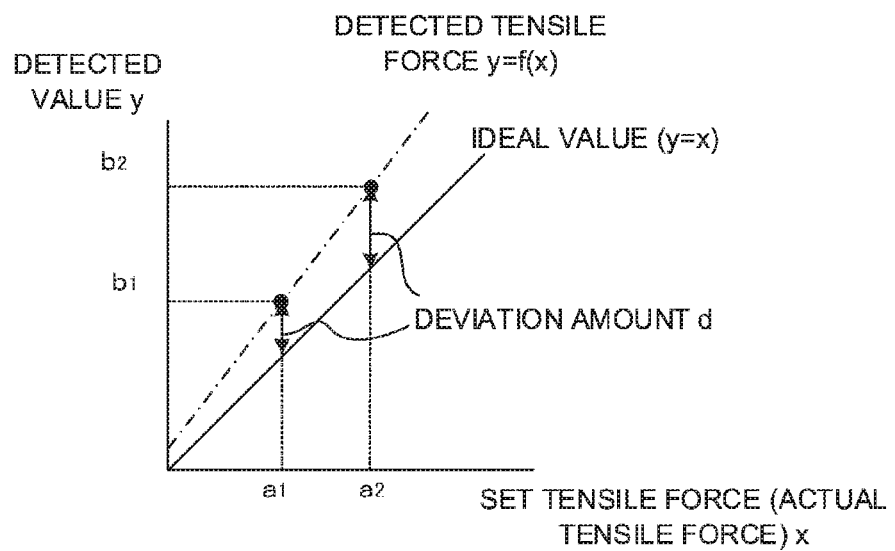
FIG. 3 shows a relational expression between a set tensile force and a detected tensile force in the embodiment, and is an explanatory diagram of a second aspect for obtaining a detected deviation amount deviated from an ideal value.

FIG. 3 is applied to a tensile force detector in which a detected tensile force y is simply proportional to a set tensile force (actual tensile force) x, but a detected tensile force y of the tensile force detector 2 is not 0 when a set tensile force x is 0. In this case, the set tensile forces x are set to $a_1$ and $a_2$, these tensile forces are applied to the wire electrode 8, respectively, and detected tensile forces y which are output from the tensile force detector 2 are obtained as $b_1$ and $b_2$. According to this, expression f(x) of the detected tensile force y expressed as a function of the set tensile force x becomes $$f(x)=\{(b_2-b_1)/(a_2-a_1)-1\}x+(a_2 \cdot b_1-a_1 \cdot b_2)/(a_2-a_1) \quad (3), \text{ and}$$

the detected deviation amount d becomes $$d=\{(b_2-b_1)/(a_2-a_1)-1\}x+(a_2 \cdot b_1-a_1 \cdot b_2)/(a_2-a_1) \quad (4).$$

Figure 4:
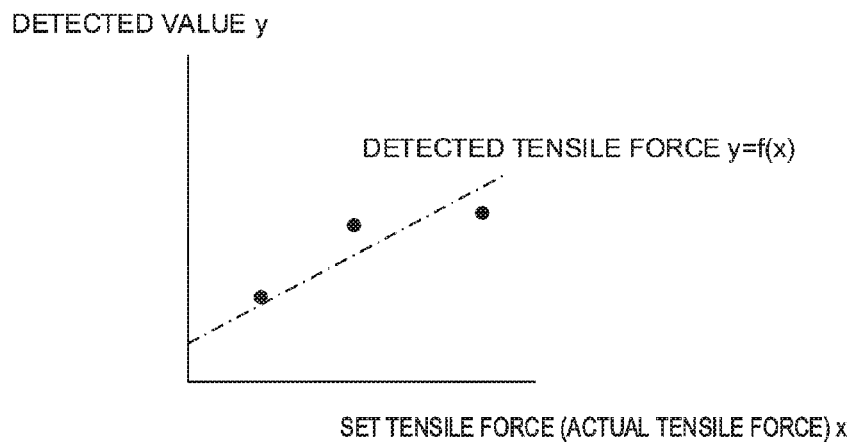
FIG. 4 shows a relational expression between a set tensile force and a detected tensile force in the embodiment, and is an explanatory diagram of a third aspect for obtaining a detected deviation amount deviated from an ideal value.

FIG. 4 is an explanatory diagram of a third aspect of obtaining a relational expression y=f(x) of a tensile force y detected by the tensile force detector 2 expressed as a function of a set tensile force x. In this third aspect, tensile forces y are detected by the tensile force detector 2 for a plurality of set tensile forces x, and a relational expression f(x) of an approximation straight line is obtained using approximate means such as a least-square method from sequence of points of the detection point (x, y).

Figure 5:
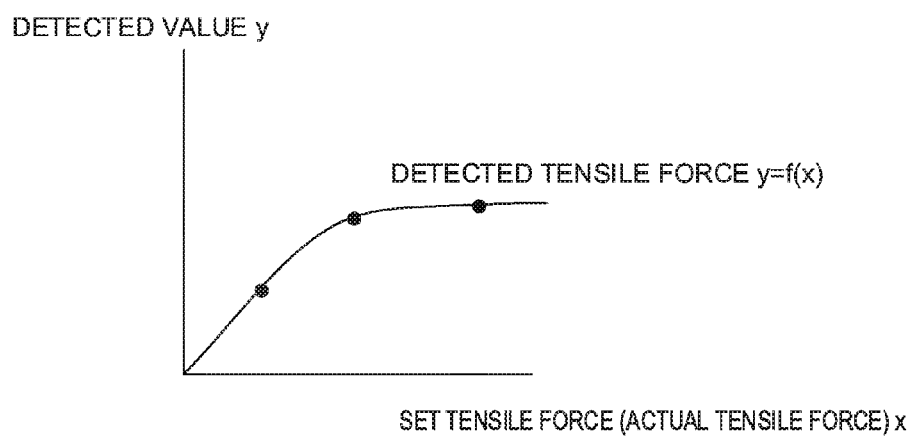
FIG. 5 shows a relational expression between a set tensile force and a detected tensile force in the embodiment, and is an explanatory diagram of a fourth aspect for obtaining a detected deviation amount deviated from an ideal value.

Further, as shown in FIG. 5, a relational expression f(x) in which these points are connected to one another through a smooth curved line may be obtained. The detected deviation amount d is obtained as a function of a set tensile force x by d=f(x)−x.

A relational expression f(x) of a detected tensile force with respect to the set tensile force may be obtained by controlling speed or torque of the supply motor 12 and the winding motor 13, and by continuously detecting output y of the tensile force detector while continuously changing the tensile force x to be given to the wire electrode.

Figure 6:
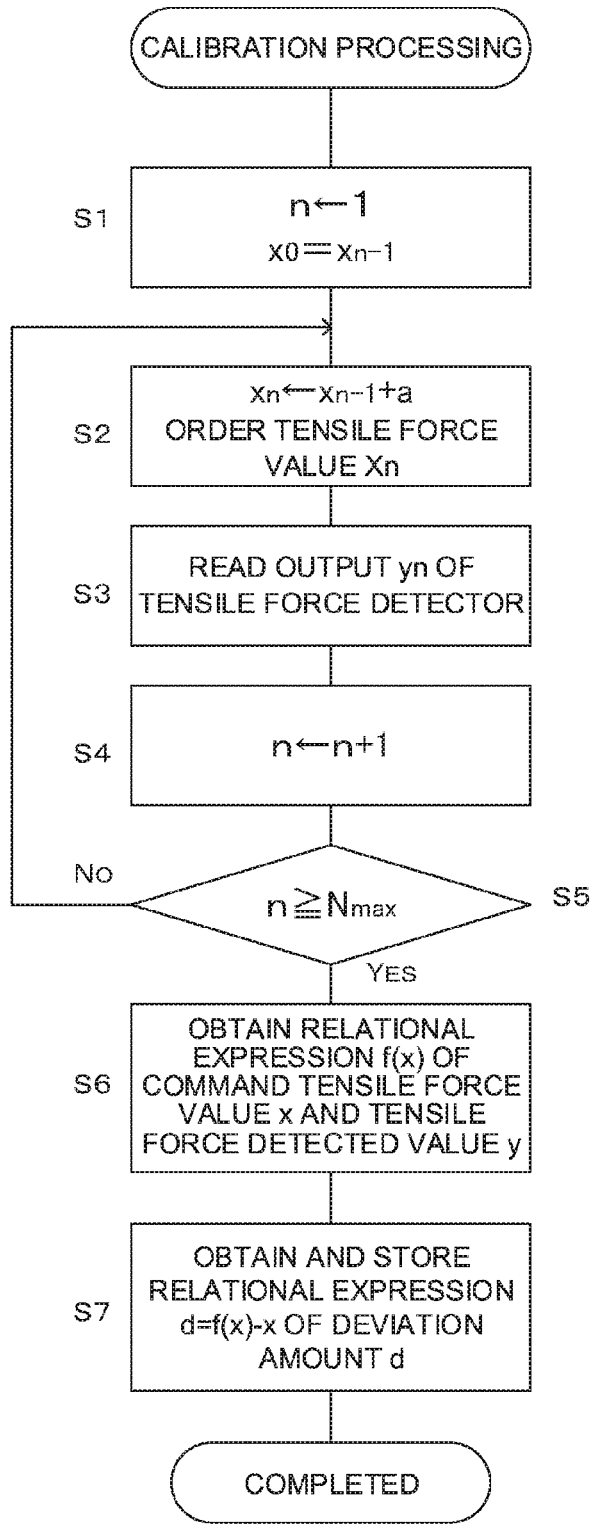
FIG. 6 is a flowchart showing an algorithm of calibration processing for obtaining a detected deviation amount between a detected tensile force and a set tensile force in the embodiment as a function of the set tensile force.

FIG. 6 is a flowchart showing an algorithm of calibration processing of the tensile force detector carried out by a processor of the calibrating unit 3, or by the processor of the NC device 1 when the calibrating unit is configured in the NC device 1.

If a calibration command of the tensile force detector 2 is input to the NC device 1, the processor which executes the calibration processing starts the processing shown in FIG. 6.

First, an index n is set to "1", an initial tensile force value $x_0$-$x_{n-1}$ is set to "0" (step S1), a set tensile force value $x_n$ which is obtained by adding a predetermined amount a to a last command tensile force value $x_{n-1}$ is obtained, and the set tensile force value $x_n$ is output to the tensile force generating unit 10 (step S2). The tensile force generating unit 10 drives and controls the supply motor 12 and the winding motor 13 through the motor control devices 11 and 14 in the same manner as that of the conventional technique, and the wire electrode 8 is made to generate the commanded tensile force $x_n$. That is, when the wire electrode is made to generate a tensile force by controlling the speeds of the supply motor 12 and the winding motor 13, speed of the winding roller 9 to wind the wire electrode and speeds of the supply roller 4 and the pinch roller 5 to send out the wire electrode are differentiated from each other, and the wire electrode is made to generate the commanded tensile force $x_n$ based on this speed difference. When the wire electrode is made to generate a command tensile force by torques of the supply motor 12 and the winding motor 13, a tensile force is generated by controlling the torques of the supply motor 12 and the winding motor 13. In this case, the wire electrode may run or stop running.

Next, a detected tensile force value $y_n$ of output of the tensile force detector 2 is read (step S3), 1 is added to the index n (step S4), it is determined whether the value of the index n is equal to or greater than the number $N_{max}$ which is set for obtaining data (step S5), and if the value of the index n is not equal to or greater than the number $N_{max}$, the procedure returns to step S2, processing in steps S2 to S5 is executed until the value of the index n reaches the set number $N_{max}$ and thereafter, the procedure is shifted to step S6. A relational expression f(x) which expresses tensile force detection y by a function of the set tensile force x from commanded set tensile force values $x_1$ to $x_{Nmax}$ and detected tensile force values $y_1$ to $y_{Nmax}$ of output of the tensile force detector is obtained (step S6), a function expression d=f(x)−x which expresses a detected deviation amount d for calibrating the tensile force detector 2 by a function of the set tensile force x is obtained and stored (step S7), and the calibration processing is completed.

For obtaining the relational expression f(x) by the first aspect shown in FIG. 2, the number $N_{max}$ for obtained the data is set to "1", the relational expression f(x) of the set tensile force x shown in the first expression and the detected tensile force y is obtained by a command tensile force value $x_1$ (a in FIG. 2) and a tensile force detected value y1 (b in FIG. 2) which is detected at that time, and a function expression of the set tensile force x which is for obtaining a deviation amount d shown in the second expression is stored.

$$d=((b/a)-1)x=((y_1/x_1)-1)x$$

For obtaining the relational expression f(x) by the second aspect shown in FIG. 3, the number $N_{max}$ for obtaining the data is set to "2", the relational expression f(x) of the set tensile force value x shown in the third expression and the tensile force detected value y is obtained by the commanded set tensile force value $x_1$, $x_2$ ($a_1$, $a_2$ in FIG. 2) and the tensile force detected value $y_1$, $y_2$ ($b_1$, $b_2$ in FIG. 2) detected at that time, and an expression for obtaining the deviation amount d shown in the expression 4 is stored.

$$d=\{(b_2-b_1)/(a_2-a_1)-1\}x+(a_2 \cdot b_1-a_1 \cdot b_2)/(a_2-a_1)=\{(y^2-y_1)/(x_2-x_1)-1\}x+(x_2 \cdot y_1-x_1 \cdot y_2)/(x_2-x_1)$$

For obtaining the relational expression f(x) by the third aspect shown in FIG. 4, the relational expression f(x) of the set tensile force value x and the tensile force detected value y is obtained by an approximate method such as a least-square method from sequence of points (($x_1$, $y_1$), ($x_2$, $y_2$), . . . ($x_{Nmax}$, $y_{Nmax}$)) which is a combination of commanded set tensile force values $x_1$, $x_2$ . . . $x_{Nmax}$ and detected tensile force detected values $y_1$, $y_2$ . . . $y_{Nmax}$. For obtaining the relational expression f(x) by the fourth aspect shown in FIG. 5, curve approximation is executed from sequence of points (($x_1$, $y_1$), ($x_2$, $y_2$) . . . ($x_{Nmax}$, $y_{Nmax}$)) which is a combination of the set tensile force value and the tensile force detected value, and the relational expression f(x) is obtained. A relational expression d=f(x)-x for obtaining the detected deviation amount d to calibrate the tensile force detector 2 by the relational expression f(x) obtained in the above-described manner is obtained and stored.

Figure 7:
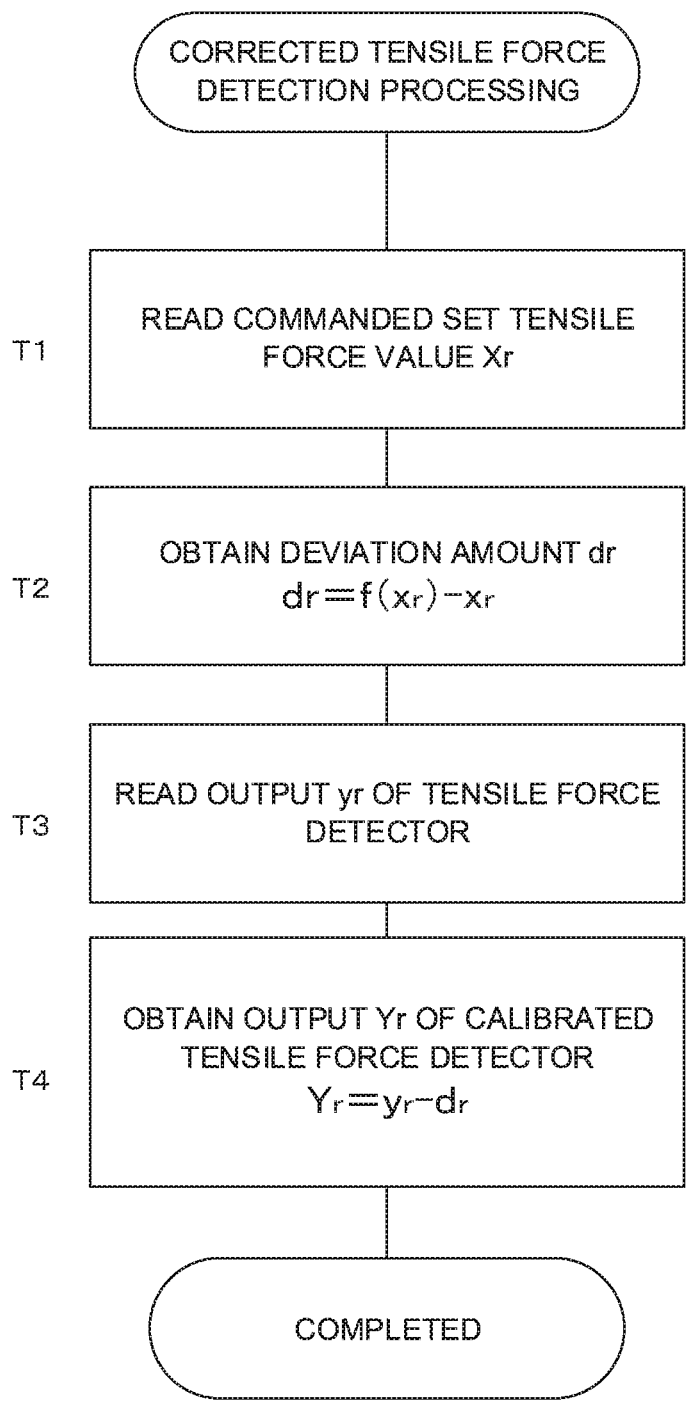
FIG. 7 is a flowchart showing an algorithm of processing for obtaining a corrected tensile force value of the embodiment.

FIG. 7 is a flowchart showing an algorithm of processing for obtaining a tensile force value obtained by calibrating and correcting the tensile force detector when the electric discharge machining is carried out.

When the electric discharge machining is carried out, the processor of the calibrating unit 3 (including calibrating unit provided in NC device 1) executes the processing shown in FIG. 7 every predetermined cycle, a tensile force of the wire electrode 8 detected by the tensile force detector 2 is corrected with a detected deviation amount d obtained by calibrating, and a corrected tensile force detected value is obtained.

First, a commanded set tensile force value $x_r$ is read (step T1), and a detected deviation amount (correction amount) $d_r$ with respect to this set tensile force value $x_r$ is obtained by a function expression d–f(x)–x of the set tensile force x which is for obtaining the detected deviation amount d obtained by the calibration processing (step T2).

Next, a detected tensile force $y_r$ which is output of the tensile force detector 2 is read (step T3), a detected tensile force $Y_r$ is obtained by subtracting a detected deviation amount (correction amount) $d_r$ from the detected tensile force $y_r$ (step T4), and the detection processing of a tensile force is completed.

The NC device 1 drives and controls the tensile force generating unit 10 based on the corrected detected value $Y_r$ obtained as described above in the same manner as that of the conventional technique, and feedback control is executed such that a tensile force of the wire electrode 8 matches with the set tensile force value.

After the tensile force value is set, the detected deviation amount (correction amount) $d_r$ with respect to the set tensile force value is changed unless this set value is not changed. Therefore, it is possible to employ such a configuration that the processing in steps T1 and T2 is carried out whenever the set value of the tensile force value is changed to obtain the detected deviation amount $d_r$ with respect to the set tensile force value, and only the processing in steps T3 and T4 is carried out when detecting a tensile force of the wire electrode.

As described above, according to the present invention, the calibration processing of the tensile force detector for obtaining the detected deviation amount d of the tensile force detector as the expression expressing as a function of the set tensile force is carried out based on the command tensile force which is set in the wire electrode and the detected tensile force which is output from the tensile force detector, the detected deviation amount with respect to the set tensile force which is set when the electric discharge machining is carried out is obtained by the function expression of the detected deviation amount, and the output of the tensile force detector is corrected. Therefore, it is possible to easily calibrate the tensile force detector. Further, even if the tensile force detector is once calibrated, there is a possibility that the detected tensile force of the tensile force detector is deviated (detected deviation amount is changed) if temperature is changed. Hence, when temperature is changed more than the difference which is set during the machining, it should be determined that the detected value of the tensile force detector is deviated, the calibration processing shown in FIG. 6 should be again executed, and a function expression for obtaining a new deviation amount should be obtained. In this case, the calibration processing may be carried out in a state where the sending operation of the wire electrode is stopped or in a state where the sending operation is not stopped. To facilitate the calibration processing associated with temperature change, it is possible to employ such a configuration that a thermometer is provided, temperature detected by the thermometer is stored in the NC device 1 or the calibrating unit 3 when the calibration processing is carried out, and when temperature is changed from the stored temperature more than a predetermined value, a signal inducing the calibration processing may be output (display on display screen for example). Furthermore, when temperature is changed from the stored temperature more than the predetermined value, the calibration processing shown in FIG. 6 may be executed automatically.

In the above-described embodiment, the relational expression f(x) of the set tensile force x and the tensile force detection y is obtained, the function expression d=f(x)–x of the detected deviation amount is obtained from the relational expression f(x) and is stored, and when the electric discharge machining is carried out, the detected deviation amount $d_r$ with respect to the set tensile force $x_r$ is obtained from the function expression d=f(x)–x of the detected deviation amount, and detected tensile force $y_r$ is corrected. Alternatively, it is possible to employ such a configuration that the relational expression f(x) is obtained, sequence of points ($x_1$, $y_1$), ($x_2$, $y_2$) . . . ($x_n$, $y_n$) which is a combination of the tensile force detections y which are detected for the plurality of set tensile forces x and the plurality of set tensile forces x is stored instead of the relational expression f(x) at the time of calibration of the tensile force detector 2 without storing the function expression d=f(x)–x of the detected deviation amount, and the detected deviation amount $d_r$ for calibrating the set tensile force value $x_r$ is obtained from the stored sequence of points. That is, among the sequence of points to be stored, interpolation is executed from two points of the set tensile force values before and after the set tensile force value, and corrected detected tensile force $Y_r$ is obtained.

Although the embodiment of the present invention has been described above, the invention is not limited to the embodiment, and the invention can be carried out in other aspects by appropriately changing the embodiment.

The invention claimed is:

1. A wire electric discharge machine, comprising:
a wire electrode;
at least one motor and at least one motor controller configured to control the at least one motor for giving a tensile force to the wire electrode;
a tensile force detector configured to detect a tensile force of the wire electrode, wherein a detected tensile force detected by the tensile force detector is fed back to perform feedback control of the tensile force of the wire electrode such that the tensile force becomes equal to a set tensile force; and
at least one processor configured to
carry out calibration for obtaining a detected deviation amount of the tensile force detector based on the set tensile force and a tensile force detected by the tensile force detector when the set tensile force is applied,
correct output of the tensile force detector by the detected deviation amount which is obtained by the calibration, and
correct a detected value of a tensile force for carrying out feedback control of the tensile force of the wire electrode based on a corrected detected tensile force which is obtained by correcting the detected tensile force of the tensile force detector.

2. The wire electric discharge machine having according to claim 1, wherein in the calibration, the detected deviation amount is obtained and stored as a function of the set tensile force, and when electric discharge machining is carried out, a detected deviation amount with respect to a value of the tensile force to be set by the function is obtained, and the detected tensile force detected by the tensile force detector is corrected with the detected deviation amount, as a corrected detected tensile force.

3. The wire electric discharge machine according to claim 1, wherein in the calibration, a sequence of points of a combination of a plurality of set tensile forces and a tensile force detected by the tensile force detector when the set tensile forces are applied is stored, and when electric discharge machining is carried out, a detected deviation amount with respect to a tensile force which is set when machining is carried out is obtained by the sequence of points of a combination of the stored set tensile force and the detected tensile force, and the detected tensile force detected by the tensile force detector is corrected with the detected deviation amount, as a corrected detected tensile force.

4. The wire electric discharge machine according to claim 1, wherein the motor is configured to apply a driving force to the wire electrode.

5. The wire electric discharge machine according to claim 1, wherein the calibration of the tensile force detector is carried out when a sending operation of the wire electrode is stopped.

6. The wire electric discharge machine according to claim 1, wherein the calibration of the tensile force detector is carried out when the wire electrode is sent out.

7. The wire electric discharge machine according to claim 1, wherein the calibration of the tensile force detector is automatically carried out when temperature is changed by a given amount, or information inducing calibration of the tensile force detector is displayed.

* * * * *